(12) United States Patent
Ikami et al.

(10) Patent No.: US 12,451,946 B2
(45) Date of Patent: Oct. 21, 2025

(54) CONTROL DEVICE THAT IMPROVES COMMUNICATION EFFICIENCY IN CELL-FREE MASSIVE MIMO SYSTEM COMPOSED OF MANY ANTENNAS, CONTROL METHOD OF THE SAME, PROCESSING DEVICE, PROCESSING METHOD OF THE SAME, AND COMPUTER-READABLE STORAGE MEDIUM

(71) Applicant: KDDI CORPORATION, Tokyo (JP)

(72) Inventors: Akio Ikami, Fujimino (JP); Yuu Tsukamoto, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 42 days.

(21) Appl. No.: 18/610,400

(22) Filed: Mar. 20, 2024

(65) Prior Publication Data

US 2024/0235648 A1 Jul. 11, 2024

Related U.S. Application Data

(63) Continuation of application No. PCT/JP2023/006704, filed on Feb. 24, 2023.

(30) Foreign Application Priority Data

Mar. 3, 2022 (JP) ................. 2022-032779

(51) Int. Cl.
*H04L 5/12* (2006.01)
*H04B 7/06* (2006.01)
*H04L 5/00* (2006.01)

(52) U.S. Cl.
CPC ......... *H04B 7/0691* (2013.01); *H04L 5/0048* (2013.01)

(58) Field of Classification Search
CPC ................ H04B 7/0691; H04L 5/0048
(Continued)

(56) References Cited

U.S. PATENT DOCUMENTS

| 2015/0092548 A1 | 4/2015 | Lightstone |
| 2016/0198480 A1 | 7/2016 | Stanwood |
| 2021/0306039 A1* | 9/2021 | Vijayan ................. G06N 20/00 |

FOREIGN PATENT DOCUMENTS

CN 108173625 A 6/2018

OTHER PUBLICATIONS

C. D'Andrea and E.G. Larsson, "User association in scalable cell-free massive MIMO systems", 2020 54th Asilomar Conference on Signals, Systems, and Computers, 2020 (5 pages).

(Continued)

*Primary Examiner* — Zewdu A Kassa
(74) *Attorney, Agent, or Firm* — Foley & Lardner LLP

(57) ABSTRACT

A control device that functions as a RIC in an O-RAN identifies a plurality of antennas that are expected to receive, with at least a predetermined power, a signal from each of a plurality of terminal devices, and notifies an O-DU that is connected to first antennas included in the plurality of antennas for a first terminal device and executes demodulation and decoding processing for the first terminal device, and is connected to second antennas included in the plurality of antennas for a second terminal device and does not execute demodulation and decoding processing for the second terminal device, of information indicating the first antennas and information indicating a third antenna among the second antennas that is a target of transmission path estimation performed based on pilot symbols received from the second terminal device.

12 Claims, 4 Drawing Sheets

(58) Field of Classification Search
USPC ............... 375/262, 260, 259, 219, 295, 316
See application file for complete search history.

(56) References Cited

OTHER PUBLICATIONS

Ikami, Akio, "Study of Inter-CPU Linkage in Large-Scale Cell Free massive MIMO for User-Centric RAN," Proceedings of the 2022 IEICE General Conference (Communication 1).
Tsukamoto, Yu et al., "A fundamental experiment of AP clustering for CF-mMIMO in user-centric RAN," IEICE Technical Report, RCS2021-268, Feb. 23, 2022, pp. 90-95 (6 pages).
Yamazaki, Kosuke et al., "Proposal for a User-Centric Ran Architecture Towards Beyond 5G", 2021 ITU Kaleidoscope Academic Conference, Dec. 10, 2021 (7 pages).
European Supplementary Search Report for EP Appl. Ser. No. 23763357 dated Mar. 27, 2025 (8 pages).

\* cited by examiner

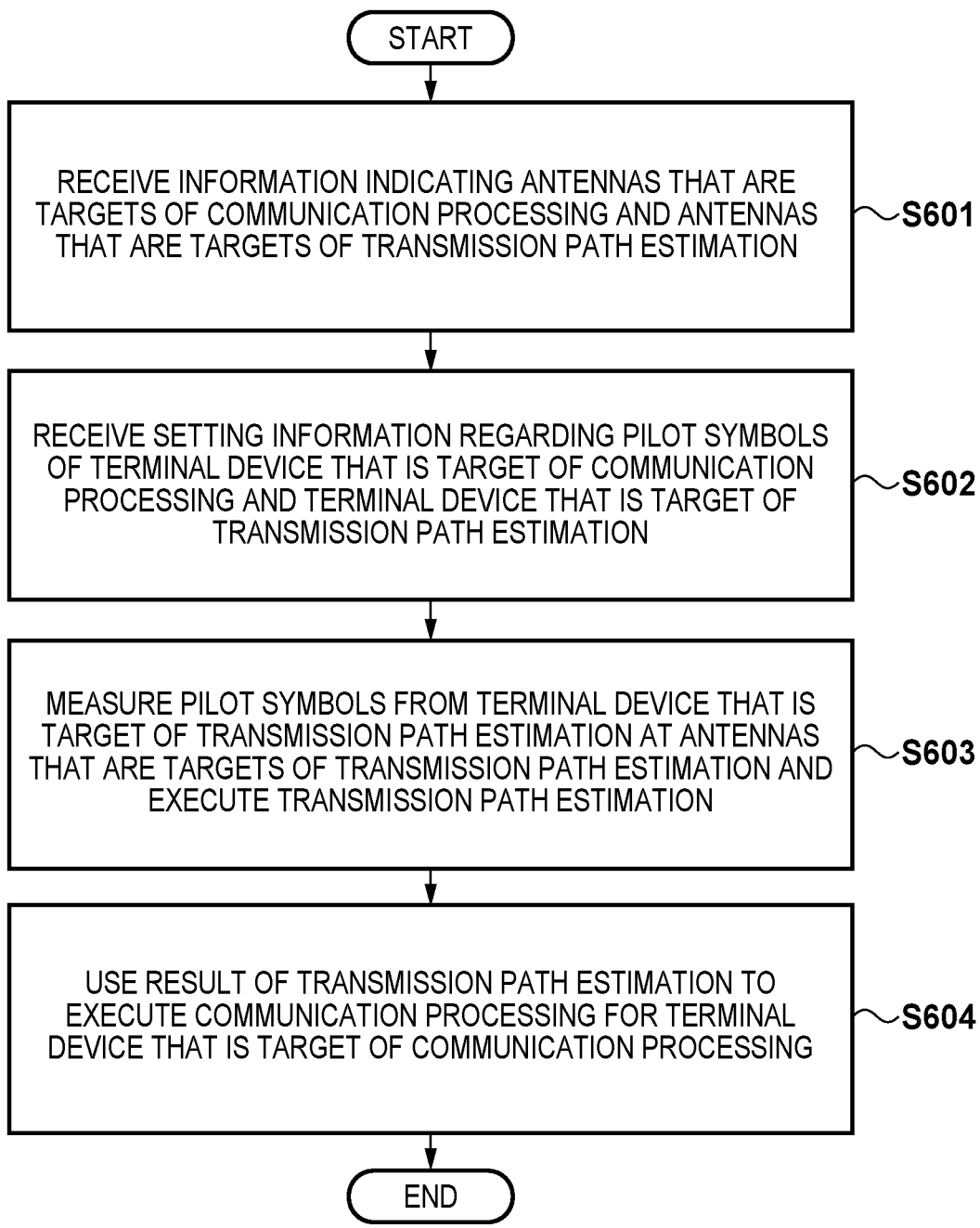

CONTROL DEVICE THAT IMPROVES COMMUNICATION EFFICIENCY IN CELL-FREE MASSIVE MIMO SYSTEM COMPOSED OF MANY ANTENNAS, CONTROL METHOD OF THE SAME, PROCESSING DEVICE, PROCESSING METHOD OF THE SAME, AND COMPUTER-READABLE STORAGE MEDIUM

CROSS-REFERENCE TO RELATED APPLICATION(S)

This application is a continuation of International Patent Application No. PCT/JP2023/006704 filed on Feb. 24, 2023, which claims priority to and the benefit of Japanese Patent Application No. 2022-032779 filed on Mar. 3, 2022, the entire disclosures of which are incorporated herein by reference.

BACKGROUND OF THE INVENTION

Field of the Invention

The present invention relates to a technology for improving a communication efficiency in a cell-free massive MIMO system composed of many antennas.

Description of the Related Art

Studies have been made on cell-free massive MIMO systems in which many antennas are arranged densely and communication with a terminal device is performed using a portion of the antennas. In such a cell-free massive MIMO system, antennas to be used are selected for each terminal device, and thus a cell is virtually configured for each terminal device, and a terminal device is located substantially at the center of a virtual cell. According to this technology, each terminal device can obtain uniform communication quality irrespective of its location.

In such a cell-free massive MIMO system, a processing device connected to antennas forms a virtual cell for each terminal device by controlling those antennas. In such a system, the number of antennas and terminal devices is enormous, and therefore, it is not easy to control the system with use of a single processing device. Accordingly, a configuration is contemplated in which a plurality of processing devices each configured to control a portion of the antennas are prepared, and each terminal device performs communication by establishing connection with any of the processing devices. When this configuration is used, if a terminal device is present at a position around an end portion of an area in which communication can be performed using antennas controlled by a processing device to which the terminal device has been connected, another processing device controlling antennas forming an area that allows communication at that position may be involved in communication performed by the terminal device. For example, the other processing device may receive a signal transmitted from the terminal device and transfer the signal to the processing device to which the terminal device has been connected, and the processing device may perform signal processing such as demodulation by using signals received by antennas connected to the processing device itself and the transferred signal (C. D' Andrea and E. G. Larsson, "User association in scalable cell-free massive MIMO systems", 2020 54th Asilomar Conference on Signals, Systems, and Computers, 2020).

In the technique described in C. D' Andrea and E. G. Larsson, "User association in scalable cell-free massive MIMO systems", 2020 54th Asilomar Conference on Signals, Systems, and Computers, 2020, a signal received by an antenna controlled by the other processing device to which the terminal device is not connected is transferred to the processing device to which the terminal device has been connected, but no consideration is given to the influence on communication performed by another terminal device that has been connected to the other processing device. Accordingly, communication performed by a terminal device connected to a processing device may interfere with another terminal device connected to another processing device, and the efficiency of the system as a whole may deteriorate.

SUMMARY OF THE INVENTION

The present invention provides a technology for improving a communication efficiency in a cell-free massive MIMO system including a plurality of processing devices connected to one or more antennas.

A control device according to one aspect of the present invention is a control device that functions as a RAN Intelligent Controller (RIC) in an Open-Radio Access Network (O-RAN), the control device comprising: one or more processors; and one or more memories that store a computer-readable instruction for causing, when executed by the one or more processors, the one or more processors to function as: an identification unit configured to identify, with respect to each of a plurality of terminal devices, a plurality of antennas that are expected to receive, with at least a predetermined power, a signal transmitted from the terminal device, based on locations of the plurality of terminal devices; and a notification unit configured to notify an O-RAN Distributed Unit (O-DU) that is connected to one or more first antennas included in the plurality of antennas for a first terminal device and executes demodulation and decoding processing for the first terminal device, and is connected to one or more second antennas included in the plurality of antennas for a second terminal device and does not execute demodulation and decoding processing for the second terminal device, of information indicating the one or more first antennas and information indicating a third antenna among the one or more second antennas, the third antenna being a target of transmission path estimation performed based on pilot symbols received from the second terminal device.

A processing device according to one aspect of the present invention is a processing device that functions as an O-RAN Distributed Unit (O-DU) connected to a plurality of antennas to perform radio communication with a terminal device in an Open-Radio Access Network (O-RAN), the processing device comprising: one or more processors; and one or more memories that store a computer-readable instruction for causing, when executed by the one or more processors, the one or more processors to function as: a receiving unit configured to receive information indicating one or more first antennas that receive a signal transmitted from a first terminal device that is a target of signal demodulation and decoding processing, among the plurality of antennas, and information indicating a third antenna among one or more second antennas that receive a signal transmitted from a second terminal device that is not a target of signal demodulation and decoding processing, among the plurality of antennas, the third antenna being a target of transmission path estimation performed based on pilot symbols received from the second terminal device; an estimation unit configured to estimate a transmission path between the third antenna and the second terminal device; and an execution unit configured to execute communication processing for the first terminal device by using a result of the transmission path estimation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a diagram showing an example flow of processing executed by the processing device.

DESCRIPTION OF THE EMBODIMENTS

Figure 1:
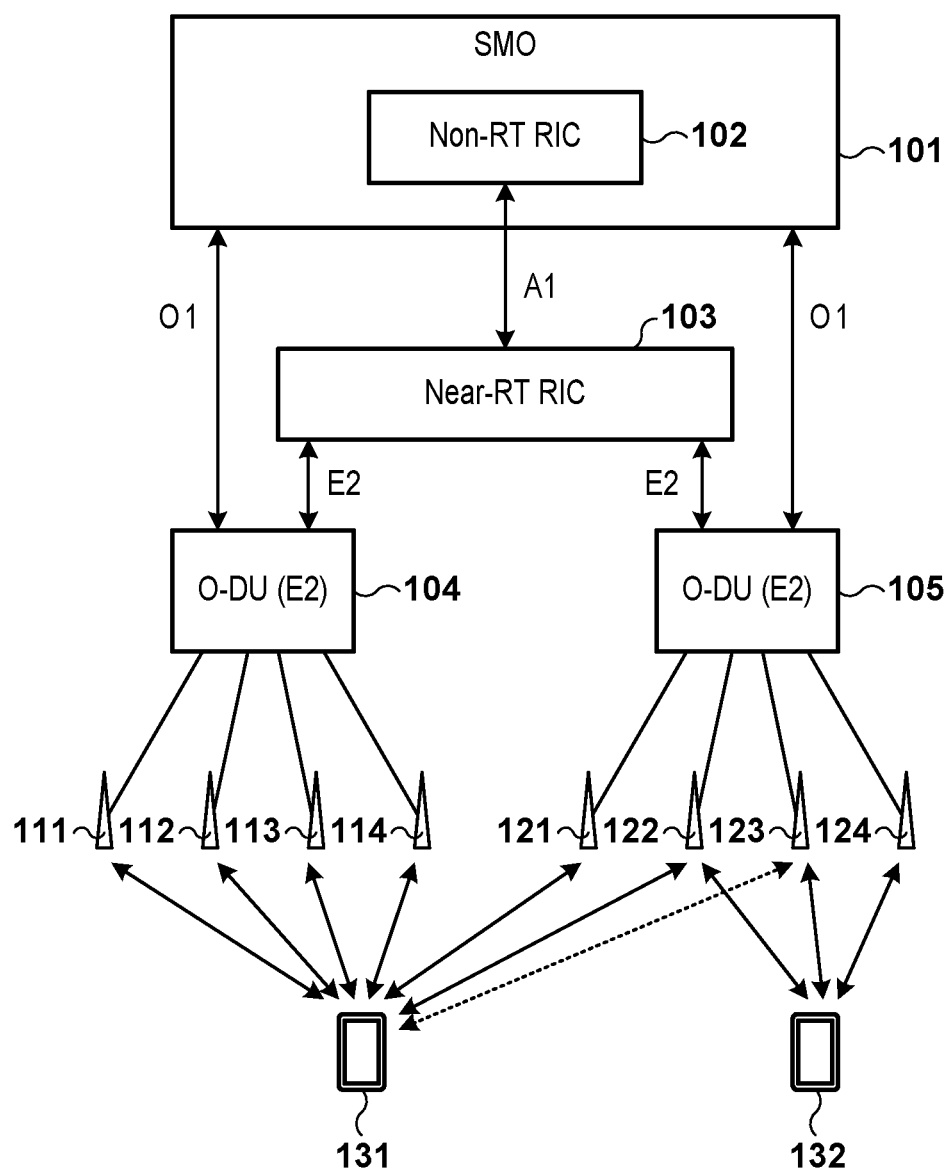
FIG. 1 is a diagram showing a configuration example of a radio communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of Radio Communication System

FIG. 1 shows a configuration example of a radio communication system according to the present embodiment. The radio communication system is a cell-free massive MIMO system in which many antennas (e.g., antennas 111 to 114 and antennas 121 to 124) are geographically distributed and a radio communication service is provided to terminal devices (e.g., a terminal device 131 and a terminal device 132) by forming a virtual cell for each terminal device with use of a portion of the antennas. In the present embodiment, many antennas are divided into a plurality of groups, the groups are respectively connected to different processing devices, and the processing devices control antenna weights, perform encoding and modulation of signals to be transmitted by the antennas, and demodulation and decoding of signals received by the antennas, for example. Note that such a processing device may be called a central processing unit (CPU), for example. Note that a virtual CPU may be set for each terminal device, and the virtual CPU may execute communication processing for the corresponding terminal device. Such a virtual CPU may also be called a vCPU. The antennas may be antennas that have a function of capturing electromagnetic waves or radiating electromagnetic waves, or communication devices that have a function of executing certain processing such as frequency conversion or amplification, for example. Such antennas may be called "access points (AP)", for example.

In an example, the radio communication system according to the present embodiment is configured using Open-Radio Access Network (O-RAN), standardization of which is promoted to make radio access networks (RANs) open and intelligent. According to the O-RAN, a RAN is made intelligent by controlling a plurality of O-DUs (E2 nodes) connected to terminal devices with use of control devices that are called RAN Intelligent Controllers (RICs). Note that O-DU is abbreviation for O-RAN Distributed Unit, and an O-DU as used herein corresponds to a processing device directly connected to antennas. Here, the antennas 111 to 114 are connected to an O-DU 104, and the antennas 121 to 124 are connected to an O-DU 105. Note that these are examples, and the RICs include a Near-RT RIC 103 that performs short period control in substantially real time (RT) and a Non-RT RIC 102 that performs long period control not in real time. Note that the Non-RT RIC 102 is configured as a portion of Service Management and Orchestration (SMO 101).

The Non-RT RIC 102 performs long term control such as RAN analysis and policy management. The Near-RT RIC 103 controls O-DUs in accordance with policies determined by the Non-RT RIC 102. Note that an interface called "O1 interface" is set between the Non-RT RIC 102 (SMO 101) and the O-DUs, an A1 interface is set between the Non-RT RIC 102 and the Near-RT RIC 103, and an E2 interface is set between the Near-RT RIC 013 and the O-DUs. Note that an interface (not shown) that enables direct communication between an O-DU and another O-DU may be prepared between the O-DUs.

In the present embodiment, it is assumed that the terminal device 131 is located near the boundary between an area in which communication can be performed via the antennas 111 to 114 and an area in which communication can be performed via the antennas 121 and 122, for example. In this case, the antennas 111 to 114 and the antennas 121 and 122 may be used in communication performed by the terminal device 131. For example, a signal transmitted from the terminal device 131 is received by the antennas 111 to 114 and the antennas 121 and 122. In a case where the O-DU 104 executes communication processing for the terminal device 131, for example, the signal received by the antennas 121 and 122 (e.g., an IQ signal subjected to frequency conversion to baseband and sampling) may be transferred from the O-DU 105 to the O-DU 104. The O-DU 104 may demodulate and decode the signal transmitted from the terminal device 131 by using the signal received via the antennas 111 to 114 and the signal received via the antennas 121 and 122. Also, data to be transmitted to the terminal device 131 is provided to the O-DU 104 and the O-DU 105, and transmitted from the antennas 111 to 114 and the antennas 121 and 122 to the terminal device 131. Note that signals transmitted from the antennas 121 and 122 may be generated by the O-DU 104, for example. In this case, signals in forms in which the antennas 121 and 122 respectively transmit signals are transmitted from the O-DU 104 to the O-DU 105. Then, the O-DU 105 converts the received signals to RF signals that can be transmitted from antennas, and performs control so that the signals will be respectively output from the antennas 121 and 122. With this configuration, when a terminal device is present in a region in which communication can be performed with a plurality of antennas connected to a plurality of O-DUs, it is possible to provide a communication service to the terminal device using the plurality of antennas connected to the plurality of O-DUs.

It is assumed that, on the other hand, the terminal device 132 is present in a region in which communication can be performed with use of the antennas 122 to 124 connected to the O-DU 105. In this case, the terminal device 132 may perform communication via the antennas 122 to 124. Note that the terminal device 132 is not located within an area in which communication can be performed with use of antennas connected to other O-DUs.

In the present embodiment, the Non-RT RIC 102 or the Near-RT RIC 103 determines O-DUs that execute communication processing relating to the terminal devices 131 and 132 based on locations of the terminal devices 131 and 132, for example. For example, the Non-RT RIC 102 or the Near-RT RIC 103 determines to execute communication processing for the terminal device 131 with use of the O-DU 104 and execute communication processing for the terminal device 132 with use of the O-DU 105. Then, the Non-RT RIC 102 or the Near-RT RIC 103 may instruct the O-DU 104 to boot a vCPU for communication processing for the terminal device 131 and instruct the O-DU 105 to boot a vCPU for communication processing for the terminal device 132 in accordance with the determination. Note that the Non-RT RIC 102 or the Near-RT RIC 103 identifies antennas that are to be used in communication for each terminal device, and transmits an instruction to each O-DU so that processing will be performed in accordance with the result of identification. For example, the Non-RT RIC 102 or the Near-RT RIC 103 may instruct the O-DU 105 to transfer signals received by the antennas 121 and 122 to the O-DU 104 for communication relating to the terminal device 131. Also, the Non-RT RIC 102 or the Near-RT RIC 103 may instruct the O-DU 104 to transmit, to the O-DU 105, signals to be transmitted from the antennas 121 and 122 to the terminal device 131. As described above, communication processing for a terminal device is executed by a single O-DU, and the O-DU may execute all of encoding and modulation processing and demodulation and decoding processing for communication relating to the terminal device. In the present embodiment, the state where an O-DU that executes communication processing for a terminal device has been determined and communication relating to the terminal device can be performed through the communication processing executed by the O-DU may be referred to as the state where the terminal device has been connected to the O-DU. Here, it can be said that the terminal device 131 has been connected to the O-DU 104 and the terminal device 132 has been connected to the O-DU 105.

Note that the Non-RT RIC 102 may determine a long-term policy, and the Near-RT RIC 103 may be configured to control O-DUs in accordance with the long-term policy. In this case, the Non-RT RIC 102 may notify the Near-RT RIC 103 of a policy based on which the Near-RT RIC 103 determines O-DUs to which terminal devices are to be respectively connected. Then, the Near-RT RIC 103 may determine O-DUs to which the terminal devices are to be respectively connected (O-DUs to be caused to boot vCPUs for communication processing for the respective terminal devices) in accordance with the policy, and control the O-DUs based on the result of determination. Also, the Near-RT RIC 103 may select antennas that are to be used in communication relating to each terminal device, and control the O-DUs to execute data transfer and the like in accordance with the result of selection.

It is assumed that, in the above-described configuration, communication processing for the terminal device 131 is executed by the O-DU 104, and communication processing for the terminal device 132 is executed by the O-DU 105. That is, the O-DU 104 boots a vCPU for the terminal device 131, and the O-DU 105 boots a vCPU for the terminal device 132. Here, the terminal device 131 performs communication not only via the antennas 111 to 114 but also via the antennas 121 and 122 as described above. Even in this case, communication processing for the terminal device 131 is executed by the vCPU booted in the O-DU 104. That is, a signal transmitted by the terminal device 131 and received via the antennas 121 and 122 is not processed by the vCPU in the O-DU 105 and is transferred as is to the O-DU 104. Accordingly, the vCPU that executes communication processing for the terminal device 132 in the O-DU 105 cannot recognize characteristics of the signal transmitted from the terminal device 131 and reduce the influence of interference from the signal transmitted from the terminal device 131 when demodulating and decoding a signal transmitted from the terminal device 132. Here, if the O-DU 105 is notified of a result of estimation of transmission paths between the terminal device 131 and the antennas 121 and 122 performed by the vCPU of the O-DU 104, for example, the vCPU of the O-DU 105 can reduce the influence of interference from the signal transmitted from the terminal device 131 by using the estimated values of transmission paths. However, in this case, the amount of information that need to be transmitted and received between the O-DU 104 and the O-DU 105 increases, and particularly when many terminal devices are present near the boundary between areas controlled by a plurality of O-DUs, like the terminal device 131, such information may take up a large proportion of the capacity of backhaul link. Also, a signal transmitted from the terminal device 131 may reach the antenna 123, which is not used for the communication, for example, but the O-DU 104 does not execute processing relating to the antenna 123, and therefore, it is not possible to reduce the influence of interference at the antenna 123.

Under the above circumstances, in the present embodiment, even when an O-DU connected to an antenna that is used for communication relating to a terminal device does not execute communication processing for the terminal device, a vCPU associated with the terminal device is set in the O-DU. Then, the vCPU executes processing for suppressing interference, such as transmission path estimation, with respect to a signal transmitted from the terminal device for which the O-DU does not execute communication processing, and provides information obtained through the processing to a vCPU that is set to perform communication relating to another terminal device with use of the same antenna as that used by the terminal device. Then, the vCPU set for the communication relating to the other terminal device executes interference suppressing control (e.g., beam control) based on the provided information. For example, not only the vCPU for communication relating to the terminal device 132, for which the O-DU 105 executes communication processing, but also a vCPU associated with the terminal device 131, for which the O-DU 105 does not execute communication processing, is set in the O-DU 105. Then, the vCPU associated with the terminal device 131 in the O-DU 105 estimates transmission paths between the antennas 121 to 123 and the terminal device 131, for example, and provides the result of transmission path estimation to the vCPU for communication relating to the terminal device 132. Note that, in an example, the vCPU associated with the terminal device 131 in the O-DU 105 is configured to execute only processing (e.g., transmission path estimation) that is necessary to suppress interference and so as not to be involved in communication relating to the terminal device 131. Based on this information, the vCPU for communication relating to the terminal device 132 can calculate antenna weights for the antennas 122 to 124 in accordance with the minimum mean squared error (MMSE) criteria, for example, and reduce interference from a signal transmitted from the terminal device 131.

In the present embodiment, in order to realize the above-described processing, the Non-RT RIC 102 or the Near-RT RIC 103 provides the O-DU 104 and the O-DU 105 with information that enables the O-DUs to execute the above-described processing. For example, the Non-RT RIC 102 or the Near-RT RIC 103 may notify the O-DU 104 and the O-DU 105 of pilot allocation information regarding each terminal device. Note that the pilot allocation information may be information that makes it possible to identify positions of frequency and time resources in which pilot symbols are transmitted from the terminal device 131 and a pilot symbol sequence, for example. In a case where the frequency and time resources in which pilot symbols are transmitted are fixed, for example, information indicating the positions of the frequency and time resources does not necessarily need to be included in the pilot allocation information. Also, in a case where the frequency and time resources in which pilot symbols are transmitted can be identified based on the sequence length of the pilot symbol sequence, for example, information indicating the positions of the frequency and time resources may be implicitly provided as the sequence length. Also, in a case where the positions of the frequency and time resources can be identified based on another parameter, the parameter may be provided. Also, information indicating transmission power at the time when pilot symbols are transmitted by the terminal device may be provided in addition to the pilot allocation information. In a case where the transmission power of pilot symbols is constant, information indicating the transmission power does not necessarily need to be provided. In a case where the transmission power of pilot symbols is determined based on a category of the terminal device or the like, suitable information, such as the category, that makes it possible to identify the transmission power may be provided. That is, setting information regarding pilot symbols for a terminal device may be provided to an O-DU that executes communication processing for the terminal device and an O-DU that executes communication processing for another terminal device that is expected to be interfered by a signal transmitted from the terminal device. According to this configuration, the O-DU 105 can obtain pilot allocation information regarding the terminal device 131 and estimate transmission paths between the terminal device 131 and the antennas 121 to 123 based on signals received from the terminal device 131 by the antennas 121 to 123, for example. In the following description, the pilot allocation information may be read as setting information regarding pilot symbols, unless otherwise stated.

Note that a pilot allocation to be used by each terminal device may be determined by the Non-RT RIC 102 or the Near-RT RIC 103. Also, the Non-RT RIC 102 or the Near-RT RIC 103 determines antennas to be used for communication relating to each terminal device as described above. Accordingly, the Non-RT RIC 102 or the Near-RT RIC 103 can identify not only an O-DU that executes communication processing for a terminal device, but also one or more O-DUs that are connected to antennas used for communication relating to the terminal device, and the one or more O-DUs may be notified of a pilot symbol sequence and frequency and time resources allocated to the terminal device. Note that a pilot allocation to be used by each terminal device may be determined by an O-DU that executes communication processing for the terminal device. In this case, information indicating the allocation may be given to the Near-RT RIC 103 or the Non-RT RIC 102, and may be given from the Near-RT RIC 103 or the Non-RT RIC 102 to other O-DUs that are connected to antennas used for communication relating to the terminal device. Note that a configuration is also possible in which the Non-RT RIC 102 or the Near-RT RIC 103 determines pilot allocation candidates that can be used at each O-DU, and each O-DU selects, from the candidates, a pilot allocation to be actually used by a terminal device for which the O-DU executes communication processing, for example. According to this configuration, by assigning different candidates to a plurality of O-DUs corresponding to adjacent areas, it is possible to prevent terminal devices connected to the adjacent O-DUs from using the same pilot allocation, and thus prevent deterioration in the precision of transmission path estimation.

As described above, different sequences may be set for respective terminal devices in pilot allocation. However, the number of sequences may become insufficient due to an increase in the number of terminal devices, and there may be a case where two or more terminal devices use the same sequence. Therefore, in a situation in which the number of terminal devices present in a certain area increases, for example, the Non-RT RIC 102 or the Near-RT RIC 103 may determine to increase the sequence length of pilot symbol sequences to be used by terminal devices present in that area. When the sequence length of pilot symbol sequences is increased, it is possible to prepare many sequence candidates that are orthogonal to each other and can be used as pilot symbol sequences, and precisely execute transmission path estimation based on signals received from each terminal device. On the other hand, in a situation in which the number of terminal devices present in a certain area decreases, for example, the Non-RT RIC 102 or the Near-RT RIC 103 may reduce the sequence length of pilot symbol sequences. In this case, it is possible to reduce frequency and time resources required for transmitting the pilot symbol sequences, and increase frequency and time resources that can be used to transmit and receive user data. In an example, the Non-RT RIC 102 or the Near-RT RIC 103 may identify the density of terminal devices in each of areas corresponding to respective O-DUs, and determine the sequence length of pilot symbol sequences to be used by terminal devices connected to an O-DU by referring to a table in which a relationship between the density and the sequence length of pilot symbol sequences is defined in advance or by inputting a value indicating the density, as an argument to a predetermined function. Then, the Non-RT RIC 102 or the Near-RT RIC 103 may notify the O-DU of policy information indicating that the sequence length of pilot symbol sequences should be increased.

In an example, the Non-RT RIC 102 identifies an area for which it is expected that the density of terminal devices will increase in a long period based on a history regarding the number of terminal devices present in each area and information indicating events or the like. Then, the Non-RT RIC 102 may determine to increase the sequence length of pilot symbol sequences, as a long-term policy for that area. Also, the Non-RT RIC 102 identifies an area for which it is expected that the density of terminal devices will decrease in a long period, and may determine to reduce the sequence length of pilot symbol sequences, as a long-term policy for that area. For example, the Non-RT RIC 102 identifies, as a density, the number of terminal devices present in each of areas in which a communication service is provided via respective antennas, determines the sequence length according to the density, and generates policy information including information that makes it possible to identify the determined sequence length. In an example, the number (density) of terminal devices may be identified as described above with respect to each of a plurality of antennas, and the sequence length may be determined based on the largest number among the numbers of terminal devices corresponding to the respective antennas. Note that the sequence length may be applied to an area in which the communication service can be provided via the antenna corresponding to the largest number of terminal devices and another area that overlaps at least partially with that area, for example. The Non-RT RIC 102 may notify at least either the Near-RT RIC 103 or O-DUs of this policy information. Note that the policy information may indicate the sequence length to be used or indicate that the currently used sequence length should be increased or reduced.

In the case where the Near-RT RIC 103 is notified of this policy information, the Near-RT RIC 103 determines the sequence length of pilot symbol sequences to be used by terminal devices controlled by each O-DU based on the policy information, generates short-term policy information, and notifies each O-DU of the policy information. Note that the short-term policy information may include information indicating the sequence length of pilot symbol sequences or information indicating that the sequence length should be increased or reduced.

Each O-DU may receive long-term policy information from the Non-RT RIC 102 or short-term policy information from the Near-RT RIC 103, and allocate a pilot symbol sequence having the sequence length specified by the policy information to a terminal device connected to the O-DU. Note that the pilot symbol sequence allocated to each terminal device may be determined by the Non-RT RIC 102 or the Near-RT RIC 103. Alternatively, the Non-RT RIC 102 or the Near-RT RIC 103 may determine sequence candidates that can be used at each O-DU among pilot symbol sequences having the determined sequence length, and notify each O-DU of information indicating the candidates. Then, each O-DU may select a pilot symbol sequence from the candidates, and allocate the selected pilot symbol sequence to a terminal device connected to the O-DU. In this case, the O-DU may notify another O-DU of information regarding pilot symbols (the sequence and frequency and time resources to be used) allocated to each terminal device via the Near-RT RIC 103.

Note that there may be a case where signals transmitted from terminal devices that use the same pilot symbol sequence reach the same antenna in the network as a result of a terminal device having moved. Therefore, the Near-RT RIC 103 may monitor the location of each terminal device, for example, so that different pilot allocation will be performed with respect to terminal devices present in an area corresponding to each antenna of each O-DU. For example, the Near-RT RIC 103 may update pilot allocation so that pilot symbol sequences and frequency and time resources used to transmit pilot symbols allocated to respective terminal devices present in an area corresponding to each antenna do not match. When the Near-RT RIC 103 has updated pilot allocation with respect to a terminal device, the Near-RT RIC 103 notifies O-DUs connected to antennas corresponding to the location of the terminal device of the updated allocation. Note that the antennas corresponding to the location of the terminal device are antennas that may receive a signal transmitted from the terminal device with power of at least a predetermined level, and are not limited to antennas that are actually used for communication with the terminal device. That is, not only an O-DU that boots a vCPU for executing communication processing for the terminal device, but also all O-DUs that boot vCPUs for executing processing for suppressing interference as described above are notified of information indicating the pilot allocation. When pilot allocation is performed by the Near-RT RIC 103 as described above with respect to terminal devices present in a wide area, it is possible to prevent a situation in which a plurality of terminal devices use a common pilot allocation with respect to the same antenna even when any of the terminal devices has moved, and it is possible to prevent deterioration in the precision of transmission path estimation.

Note that the Non-RT RIC 102 or the Near-RT RIC 103 may notify each O-DU of information indicating an antenna via which pilot symbols to be used for transmission path estimation are to be received, with respect to each terminal device. For example, in the state shown in FIG. 1, the Non-RT RIC 102 or the Near-RT RIC 103 may notify the O-DU 105 that transmission path estimation for the terminal device 131 should be performed using pilot symbols received via the antennas 122 and 123. Note that the antenna 121 may receive a signal from the terminal device 131 with a sufficiently strong power level, but the signal does not affect communication relating to the terminal device 132, and therefore, it can be determined that there is no need to estimate the transmission path. As described above, the O-DU 105 may be notified of information indicating that transmission path estimation should be performed only with respect to antennas at which non-negligible interference may occur on communication relating to the terminal device 132. According to this configuration, the O-DU 105 can be kept from performing transmission path estimation for the terminal device 131 with respect to the antennas 121 and 124, for example. Accordingly, transmission path estimation is not performed on a signal received via the antenna 124, which is not affected by communication relating to the terminal device 131 or is affected at a sufficiently low level, and therefore, it is possible to suppress consumption of computation resources in the O-DU 105.

Device Configuration

Figure 2:
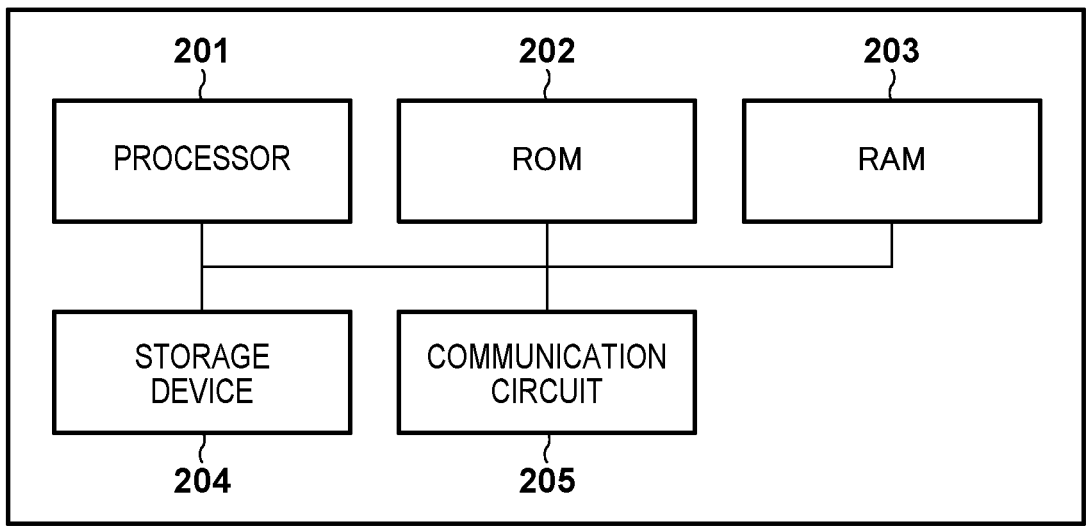
FIG. 2 is a diagram showing a hardware configuration example of a device.

Next, the following describes configurations of a control device (at least either of the Non-RT RIC 102 and the Near-RT RIC 103) and a processing device (O-DU). FIG. 2 shows a hardware configuration example of the control device and the processing device. Note that the Non-RT RIC 102 and the Near-RT RIC 103 may be realized as logical configurations, and functions of these RICs may be implemented in a single control device. Alternatively, the functions of the RICs may be implemented by a plurality of devices in a distributed manner. Also, functions of the O-DU may be implemented using a single processing device or may be implemented using a plurality of devices in a distributed manner.

In an example, the control device and the processing device each include a processor 201, a ROM 202, a RAM 203, a storage device 204, and a communication circuit 205. In the control device and the processing device, the processor 201 executes a computer-readable program that is recorded in any of the ROM 202, the RAM 203, and the storage device 204, for example, and realizes the above-described functions of each device. Note that the processor 201 may be replaced by one or more processors such as an ASIC (Application-Specific Integrated Circuit), an FPGA (Field Programmable Gate Array), a DSP (Digital Signal Processor), or the like. In the control device and the processing device, the processor 201 controls the communication circuit 205 to communicate with other devices, for example. The schematic diagram shown in FIG. 2 shows the control device or the processing device including a single communication circuit 205, but there is no limitation to this configuration.

Figure 3:
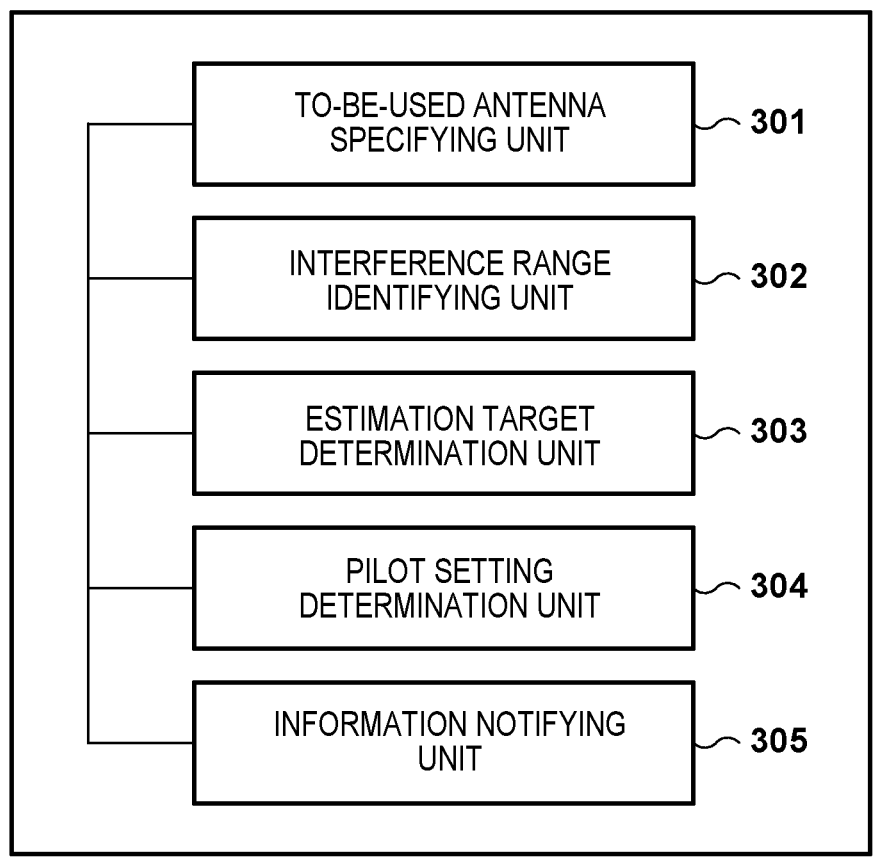
FIG. 3 is a diagram showing a functional configuration example of a control device.

FIG. 3 shows a functional configuration example of the control device that functions as an RIC (at least either of the Non-RT RIC 102 and the Near-RT RIC 103). Functions shown in FIG. 3 are realized as a result of the processor 201 included in the control device executing a program stored in the ROM 202, the RAM 203, or the storage device 204, for example. Note that the control device may include hardware corresponding to at least any of the following functions. Note that FIG. 3 selectively shows functional units relating particularly to the present embodiment, among functions of the control device, and the control device naturally has common functions of RICs. The control device includes a to-be-used antenna specifying unit 301, an interference range identifying unit 302, an estimation target determination unit 303, a pilot setting determination unit 304, and an information notifying unit 305 as functional units, for example.

The to-be-used antenna specifying unit 301 specifies, with respect to each terminal device, antennas that are to be used when providing a communication service to the terminal device among many antennas arranged over an area and each connected to any of O-DUs. The interference range identifying unit 302 identifies, with respect to each terminal device, antennas for which it is expected that a signal transmitted from the terminal device will interfere with communication relating to another terminal device at a sufficiently high power level. For example, based on the location of a terminal device, the interference range identifying unit 302 identifies a group of antennas that are expected to receive a signal transmitted from the terminal device with at least a predetermined power. Then, the to-be-used antenna specifying unit 301 may specify, from the group of antennas, antennas that are near the location of the terminal device or for which it is expected that good radio quality will be obtained in communication with the terminal device, for example, as antennas to be used for communication relating to the terminal device.

Note that the to-be-used antenna specifying unit 301 may identify O-DUs to which the antennas used for communication relating to the terminal device are connected, and determine an O-DU to which the largest number of antennas used for the communication are connected, as an O-DU that executes communication processing for the terminal device including demodulation and decoding of signals, for example. Alternatively, the to-be-used antenna specifying unit 301 may select the O-DU that executes communication processing for the terminal device based on the state of loads on one or more O-DUs to which the antennas used for communication relating to the terminal device are connected, for example. Then, the control device may notify, via the information notifying unit 305, for example, the O-DU that executes the communication processing of identification information of the terminal device that is the target of the communication processing and information regarding other O-DUs connected to the antennas used for communication relating to the terminal device. Also, the control device may notify the other O-DUs connected to the antennas used for communication relating to the terminal device of information specifying the antennas used for communication relating to the terminal device and information specifying the O-DU that executes communication processing for the terminal device.

Note that the to-be-used antenna specifying unit 301 and the interference range identifying unit 302 specify antennas with respect to each terminal device. For example, in the example shown in FIG. 1, the interference range identifying unit 302 identifies the antennas 111 to 114 and the antennas 121 to 123 as a group of antennas that are expected to receive a signal transmitted from the terminal device 131 with at least a predetermined power based on the location of the terminal device 131. Also, the interference range identifying unit 302 identifies the antennas 122 to 124 as a group of antennas that are expected to receive a signal transmitted from the terminal device 132 with at least the predetermined power based on the location of the terminal device 132. The to-be-used antenna specifying unit 301 may specify, from the identified groups of antennas, the antennas 111 to 114 and the antennas 121 and 122 as antennas to be used for communication relating to the terminal device 131 and specify the antennas 122 to 124 as antennas to be used for communication relating to the terminal device 132.

With respect to each terminal device for which the identification of antennas has been performed by the interference range identifying unit 302, the estimation target determination unit 303 determines an O-DU that should perform transmission path estimation without executing communication processing for the terminal device, and antennas that are connected to the O-DU, based on antennas for which interference with communication relating to another terminal device is expected. For example, when communication performed by the terminal device 131 may interference with communication performed by another terminal device at the antennas 111 to 114 and the antennas 121 to 123, and the O-DU 104 executes communication processing for the terminal device 131, the estimation target determination unit 303 may determine to cause the O-DU 105 connected to the antennas 121 to 123 at which interference may occur, to perform transmission path estimation, out of O-DUs that do not perform communication processing for the terminal device 131. Also, the estimation target determination unit 303 may determine all of the antennas 121 to 123 at which interference may occur, as targets of the transmission path estimation performed with respect to the terminal device 131, out of the antennas connected to the O-DU 105, for example. That is, in an example, out of O-DUs connected to antennas at which interference from a signal transmitted from a terminal device may occur, an O-DU that does not perform communication processing for the terminal device may be determined as an O-DU that should execute transmission path estimation, and out of antennas connected to the O-DU, all antennas at which interference may occur may be determined as targets of the transmission path estimation performed with respect to the terminal device. Note that this is an example, and a configuration is also possible in which, out of the antennas 121 to 124 connected to the O-DU 105, only the antennas 122 to 124 used for communication relating to the terminal device 132, which is the target of communication processing performed by the O-DU 105, may be determined as targets of the transmission path estimation performed with respect to the terminal device 131, for example. In this case, interference from a signal transmitted from the terminal device 131 may occur at the antennas 121 to 123, and accordingly, it is possible to determine, as targets of the transmission path estimation performed with respect to the terminal device 131, only the antennas 122 and 123, which are included in both of the antennas 121 to 123 and the antennas 122 to 124 used for communication relating to the terminal device 132. In this case, O-DUs that do not perform communication processing for any of the terminal devices may not perform transmission path estimation.

In general, with respect to an O-DU, such as the O-DU 105, that is connected to one or more first antennas (the antennas 122 to 124) included in a plurality of antennas that are expected to receive a signal transmitted from a first terminal device (the terminal device 132) with at least a predetermined power and executes demodulation and decoding processing for the first terminal device, and is connected to one or more second antennas (the antennas 121 to 123) included in a plurality of antennas (the antennas 111 to 114 and antennas 121 to 123) that are expected to receive a signal transmitted from a second terminal device (the terminal device 131) with at least the predetermined power and does not execute demodulation and decoding processing for the second terminal device, it is determined to cause the O-DU to only perform transmission path estimation without executing communication processing like that described above. Such an O-DU is notified of information indicating the first antennas specified by the to-be-used antenna specifying unit 301 with respect to the first terminal device. Also, the O-DU is notified of information indicating one or more third antennas (e.g., the antennas 122 and 123) that are targets of the transmission path estimation among the second antennas identified by the interference range identifying unit 302 with respect to the second terminal, which is not the target of communication processing. Note that these types of information may be provided via the information notifying unit 305, for example. Note that the O-DU 105 may also be notified of information indicating one or more fourth antennas that are specified by the to-be-used antenna specifying unit 301 as antennas to be used for communication relating to the second terminal device. Note that the fourth antennas used for communication relating to the second terminal device are at least a portion of the one or more second antennas included in the plurality of antennas expected to receive a signal transmitted from the second terminal device with at least the predetermined power. For example, the O-DU 105 shown in FIG. 1 is notified of information indicating the antennas 121 and 122, which are used for communication relating to the terminal device 131 and are a portion of the antennas 121 to 123 expected to receive a signal transmitted from the terminal device 131 with at least the predetermined power. Based on the notification, the O-DU 105 transfers signals received by the antennas 121 and 122 to the O-DU that executes communication processing for the terminal device 131. Note that a signal received from the second terminal device (the terminal device 131) by a fifth antenna (e.g., the antenna 123) that does not belong to the fourth antennas (the antennas 121 and 122) among the second antennas (the antennas 121 to 123) is not transferred to the O-DU that executes communication processing for the second terminal device.

The pilot setting determination unit 304 determines setting information regarding pilot symbols to be used for transmission path estimation by each terminal device. The setting information regarding pilot symbols includes information that makes it possible to identify a pilot symbol sequence to be transmitted from each terminal device, as described above. In an example, the information that makes it possible to identify a pilot symbol sequence may be the pilot symbol sequence itself or a value indicating any of indexes respectively assigned to pilot symbol sequence candidates in advance. Also, the setting information regarding pilot symbols may include information that makes it possible to identify frequency and time resources that are used when the pilot symbols are transmitted. The information that makes it possible to identify frequency and time resources may be information directly specifying the frequency and time resources or information such as an index for specifying an allocation pattern to be used among a plurality of allocation patterns of frequency and time resources. Also, the setting information regarding pilot symbols may include information that makes it possible to identify transmission power at the time when the pilot symbols are transmitted.

Note that in the case where the control device has the functions of the Non-RT RIC 102, the pilot setting determination unit 304 may also identify the number (density) of terminal devices present in an area in which the communication service can be provided via each of a plurality of antennas connected to an O-DU, and determine the sequence length of the pilot symbol sequence based on the number. For example, the sequence length of the pilot symbol sequence may be set in such a manner that the sequence length increases as the density of terminal devices increases, and the sequence length decreases as the density of terminal devices decreases. Note that the sequence length may be determined through calculation by using a function and information indicating the density of terminal devices as an argument or may be determined by referring to a table in which a relationship between the density of terminal devices and the sequence length is defined, for example. The control device may notify a device functioning as the Near-RT RIC 103 or each O-DU of the determined sequence length via the information notifying unit 305.

Note that in the case where the control device has the functions of the Near-RT RIC 103 and when it is expected that signals transmitted from a plurality of terminal devices will be received by a common antenna based on the locations of the terminal devices, for example, the pilot setting determination unit 304 may determine setting information to be used by each of the terminal devices in such a manner that the plurality of terminal devices do not use the same setting information regarding pilot symbols. In particular, the pilot setting determination unit 304 may determine setting information to be used by each terminal device in such a manner that the plurality of terminal devices do not transmit the same pilot symbol sequence using the same frequency and time resources. The control device may notify the O-DU that executes communication processing for each terminal device of the setting information determined as described above, and cause the O-DU to notify each terminal device of the setting information.

The information notifying unit 305 notifies O-DUs or another control device (e.g., when the control device is a Non-RT RIC, a control device that functions as a Near-RT RIC) of the information determined or set by the above-described functional units. Note that information is given to O-DUs via the O1 interface in the case where the control device is a Non-RT RIC, and via the E2 interface in the case where the control device is a Near-RT RIC. Also, in the case where the control device is a Non-RT RIC, information may be given to another control device that functions as a Near-RT RIC via the A1 interface.

Figure 4:
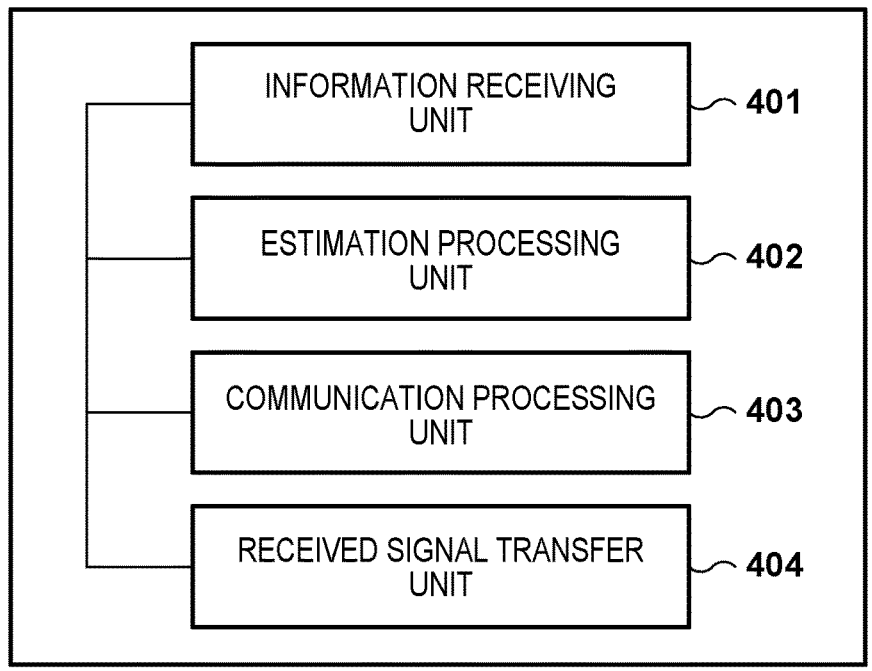
FIG. 4 is a diagram showing a functional configuration example of a processing device.

FIG. 4 shows a functional configuration example of the processing device that functions as an O-DU. Functions shown in FIG. 4 are realized as a result of the processor 201 included in the processing device executing a program stored in the ROM 202, the RAM 203, or the storage device 204, for example. Note that the processing device may include hardware corresponding to at least any of the following functions. Note that FIG. 4 selectively shows functional units relating particularly to the present embodiment, among functions of the processing device, and the processing device naturally has common functions of O-DUs. The processing device includes an information receiving unit 401, an estimation processing unit 402, a communication processing unit 403, and a received signal transfer unit 404 as functional units, for example.

The information receiving unit 401 receives information given by the control device as described above. For example, when it is expected that an antenna that is connected to the processing device will receive a signal transmitted from a terminal device with at least a predetermined power, the information receiving unit 401 receives information in which the terminal device is associated with the antenna. For example, the information receiving unit 401 of the O-DU 105 may receive information in which the terminal device 131, which is not the target of communication processing, is associated with the antennas 121 to 123 and information in which the terminal device 132, which is the target of communication processing, is associated with the antennas 122 to 124. Note that, when it has been determined by the control device that targets of transmission path estimation are only the antennas 122 and 123 with respect to the terminal device 131, the information receiving unit 401 of the O-DU 105 may receive information in which the antennas 122 and 123 are associated with the terminal device 131. Also, the information receiving unit 401 may receive setting information regarding pilot symbols used by each terminal device when transmitting pilot symbols. For example, the information receiving unit 401 of the O-DU 105 receives setting information regarding pilot symbols for the terminal device 131 and the terminal device 132. Note that the O-DU 105 may notify the terminal device 132, which is the target of communication processing, of the setting information regarding pilot symbols received by the information receiving unit 401, and instruct the terminal device 132 to transmit pilot symbols in accordance with the setting information. On the other hand, the O-DU 105 does not notify the terminal device 131, which is not the target of communication processing, of the received setting information. This is because the terminal device 131 is notified of the setting information by the O-DU 104, which executes communication processing for the terminal device 131.

Based on the information received by the information receiving unit 401, the estimation processing unit 402 receives pilot symbols from a terminal device that is the target of transmission path estimation (not the target of communication processing) via antennas that are targets of transmission path estimation, and executes transmission path estimation based on the result of reception. The communication processing unit 403 executes interference suppressing control based on the MMSE criteria, for example, with respect to a signal received from a terminal device that is the target of communication processing, by using the result of transmission path estimation, and executes reception processing including demodulation and decoding of the signal subjected to the interference suppression. The received signal transfer unit 404 transfers a signal received via an antenna that is used for communication relating to a terminal device that is not the target of communication processing to an O-DU that executes communication processing for the terminal device, for example.

Flow of Processing

Next, the following describes an example flow of processing executed by the control device and an example flow of processing executed by the processing device. Since details of the processing executed by each device are as described above, the following only describes an outline of the processing executed by each device.

Figure 5:
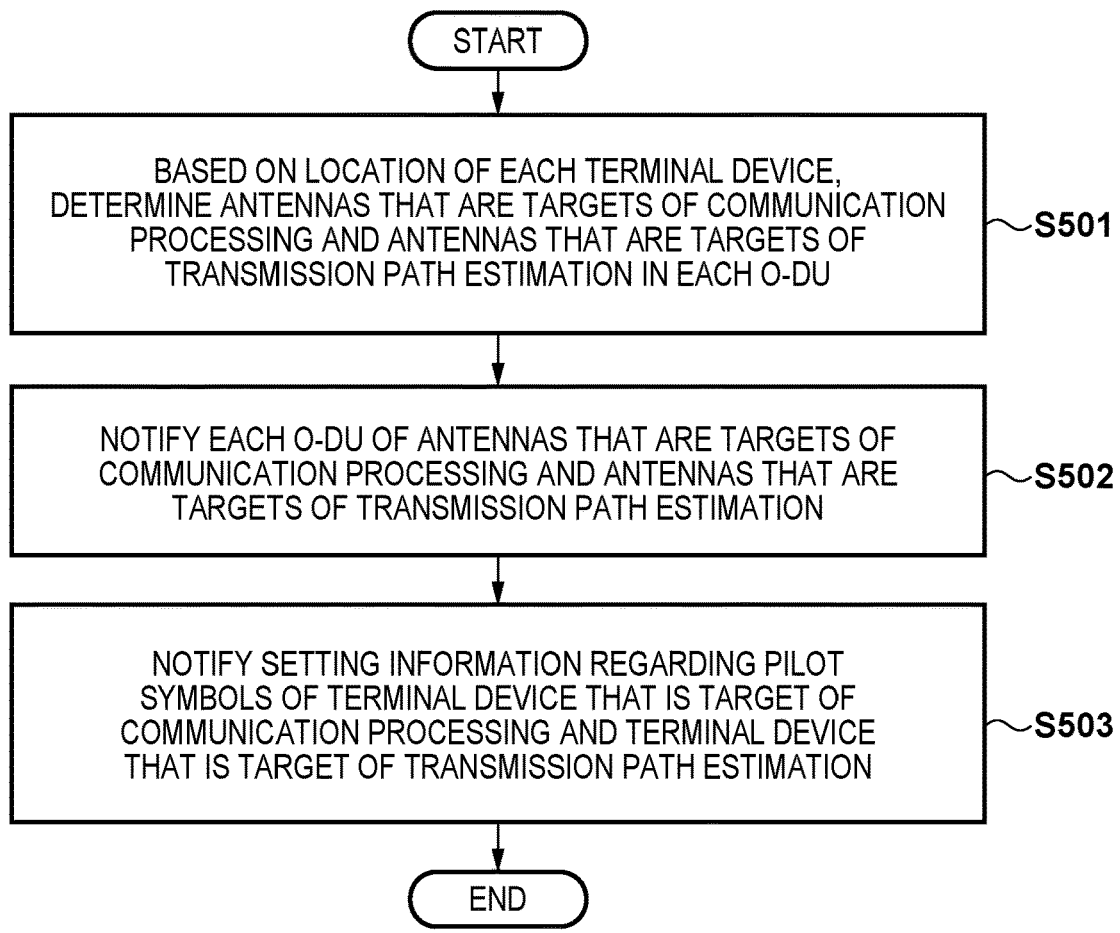
FIG. 5 is a diagram showing an example flow of processing executed by the control device.

FIG. 5 is a diagram showing an example flow of processing executed by the control device. The control device identifies, with respect to each of a plurality of terminal devices, for example, antennas that are expected to receive a signal transmitted from the terminal device with at least a predetermined power. Then, in an example, the control device may determine an O-DU that executes communication processing for each terminal device based on the identified antennas. Then, with respect to an O-DU, the control device specifies antennas that are expected to receive a signal transmitted from a terminal device that is the target of communication processing, with at least the predetermined power, as targets of communication processing, and specifies antennas that are expected to receive a signal transmitted from a terminal device that is not the target of communication processing, with at least the predetermined power, as targets of transmission path estimation (S501). Then, the control device notifies each O-DU of antennas that are targets of communication processing and antennas that are targets of transmission path estimation for the O-DU (S502). Note that each O-DU is notified of information in which antennas that are targets of communication processing are associated with a terminal device that is the target of communication processing and information in which antennas that are targets of transmission path estimation are associated with a terminal device that is the target of transmission path estimation. Also, the control device notifies each O-DU of setting information regarding pilot symbols used by the terminal device that is the target of communication processing and setting information regarding pilot symbols used by the terminal device that is the target of transmission path estimation for the O-DU (S503). Note that the control device may update setting information regarding pilot symbols to be used by each terminal device periodically or when it is determined that interference may occur between pilot symbols transmitted from a plurality of terminal devices, for example.

FIG. 6 is a diagram showing an example flow of processing executed by the processing device. The processing device receives information that is transmitted from the control device in step S502, for example, and specifies antennas that are targets of communication processing and antennas that are targets of transmission path estimation for the processing device itself (S601). Also, the processing device receives setting information regarding pilot symbols used by a terminal device that is the target of communication processing and setting information regarding pilot symbols used by a terminal device that is the target of transmission path estimation (S602). Note that the processing device may perform setting processing regarding pilot symbols for the terminal device that is the target of communication processing, and in this case, the processing device may receive only setting information regarding pilot symbols used by the terminal device that is the target of transmission path estimation in step S602. Then, based on the information received in steps S601 and S602, the processing device executes transmission path estimation by measuring pilot symbols transmitted from the terminal device that is the target of transmission path estimation at the antennas that are targets of transmission path estimation (S603). Then, the processing device executes communication processing including demodulation and decoding of a signal transmitted from the terminal device that is the target of communication processing by using the result of transmission path estimation (S604).

Note that the above-described processing is an example, and the processing does not necessarily need to be performed as shown in FIGS. 5 and 6. For example, each O-DU may execute transmission path estimation for all antennas connected to the O-DU with respect to each terminal device that is not the target of processing. In this case, antennas that are targets of transmission path estimation do not necessarily need to be specified, and the processing in steps S501, S502, and S601 may be omitted, for example. On the other hand, when the processing in steps S501, S502, and S601 is performed, antennas for which transmission path estimation is executed are limited, and therefore, it is possible to save computing resources of the O-DU. Also, each O-DU may execute transmission path estimation by using all possible setting information regarding pilot symbols. In this case, the O-DU need not obtain setting information regarding pilot symbols used by each terminal device, and therefore, the processing in steps S503 and S602 may be omitted, for example. On the other hand, when the processing in steps S503 and S602 is performed, transmission path estimation can be executed using limited setting information, and therefore, it is possible to save computing resources of the O-DU.

As described above, in a cell-free massive MIMO system including a plurality of processing devices connected to one or more antennas, a processing device can perform communication relating to a terminal device that is the target of communication processing for the processing device itself at high efficiency by suppressing interference from a terminal device that is the target of communication processing performed by another processing device. Therefore, it is possible to contribute to achieving the Goal 9 "Build resilient infrastructure, promote sustainable industrialization and foster innovation." of the Sustainable Development Goals (SDGs) promoted by the United Nations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device that functions as a RAN Intelligent Controller (RIC) in an Open-Radio Access Network (O-RAN), the control device comprising:
one or more processors; and
one or more memories that store a computer-readable instruction for causing, when executed by the one or more processors, the one or more processors to function as:
an identification unit configured to identify, with respect to each of a plurality of terminal devices, a plurality of antennas that are expected to receive, with at least a predetermined power, a signal transmitted from the terminal device, based on locations of the plurality of terminal devices; and
a notification unit configured to notify an O-RAN Distributed Unit (O-DU) that is connected to one or more first antennas included in the plurality of antennas for a first terminal device and executes demodulation and decoding processing for the first terminal device, and is connected to one or more second antennas included in the plurality of antennas for a second terminal device and does not execute demodulation and decoding processing for the second terminal device, of information indicating the one or more first antennas and information indicating a third antenna among the one or more second antennas, the third antenna being a target of transmission path estimation performed based on pilot symbols received from the second terminal device.

2. The control device according to claim 1,
wherein the third antenna is included in both the one or more first antennas and the one or more second antennas.

3. The control device according to claim 1,
wherein the one or more second antennas include a fourth antenna that is used to receive a signal for which demodulation and decoding processing is performed by another O-DU for the second terminal device, and
a signal received from the second terminal device via the fourth antenna is transferred from the O-DU to the other O-DU.

4. The control device according to claim 3,
wherein the third antenna includes a fifth antenna that receives a signal for which demodulation and decoding processing is not performed by the other O-DU for the second terminal device, and
a signal received from the second terminal device via the fifth antenna is not transferred from the O-DU to the other O-DU.

5. A processing device that functions as an O-RAN Distributed Unit (O-DU) connected to a plurality of antennas to perform radio communication with a terminal device in an Open-Radio Access Network (O-RAN), the processing device comprising:
one or more processors; and
one or more memories that store a computer-readable instruction for causing, when executed by the one or more processors, the one or more processors to function as:
a receiving unit configured to receive information indicating one or more first antennas that receive a signal transmitted from a first terminal device that is a target of signal demodulation and decoding processing, among the plurality of antennas, and information indicating a third antenna among one or more second antennas that receive a signal transmitted from a second terminal device that is not a target of signal demodulation and decoding processing, among the plurality of antennas, the third antenna being a target of transmission path estimation performed based on pilot symbols received from the second terminal device;
an estimation unit configured to estimate a transmission path between the third antenna and the second terminal device; and
an execution unit configured to execute communication processing for the first terminal device by using a result of the transmission path estimation.

6. The processing device according to claim 5,
wherein the third antenna is included in both the one or more first antennas and the one or more second antennas.

7. The processing device according to claim 5,
wherein the one or more second antennas include a fourth antenna that is used to receive a signal for which demodulation and decoding processing is performed by another O-DU for the second terminal device, and
the computer-readable instruction further causes, when executed by the one or more processors, the one or more processors to function as a transfer unit configured to transfer a signal received via the fourth antenna from the second terminal device to the other O-DU.

8. The processing device according to claim 7, wherein the third antenna includes a fifth antenna that receives a signal for which demodulation and decoding processing is not performed by the other O-DU for the second terminal device, and a signal received from the second terminal device via the fifth antenna is not transferred to the other O-DU.

9. A control method to be executed by a control device that functions as a RAN Intelligent Controller (RIC) in an Open-Radio Access Network (O-RAN), the method comprising:

identifying, with respect to each of a plurality of terminal devices, a plurality of antennas that are expected to receive, with at least a predetermined power, a signal transmitted from the terminal device, based on locations of the plurality of terminal devices; and notifying an O-RAN Distributed Unit (O-DU) that is connected to one or more first antennas included in the plurality of antennas for a first terminal device and executes demodulation and decoding processing for the first terminal device, and is connected to one or more second antennas included in the plurality of antennas for a second terminal device and does not execute demodulation and decoding processing for the second terminal device, of information indicating the one or more first antennas and information indicating a third antenna among the one or more second antennas, the third antenna being a target of transmission path estimation performed based on pilot symbols received from the second terminal device.

10. A processing method to be executed by a processing device that functions as an O-RAN Distributed Unit (O-DU) connected to a plurality of antennas to perform radio communication with a terminal device in an Open-Radio Access Network (O-RAN), the method comprising:

receiving information indicating one or more first antennas that receive a signal transmitted from a first terminal device that is a target of signal demodulation and decoding processing, among the plurality of antennas, and information indicating a third antenna among one or more second antennas that receive a signal transmitted from a second terminal device that is not a target of signal demodulation and decoding processing, among the plurality of antennas, the third antenna being a target of transmission path estimation performed based on pilot symbols received from the second terminal device;

estimating a transmission path between the third antenna and the second terminal device; and executing communication processing for the first terminal device by using a result of the transmission path estimation.

11. A non-transitory computer-readable storage medium that stores a program for causing a computer included in a control device, which functions as a RAN Intelligent Controller (RIC) in an Open-Radio Access Network (O-RAN), to:

identify, with respect to each of a plurality of terminal devices, a plurality of antennas that are expected to receive, with at least a predetermined power, a signal transmitted from the terminal device, based on locations of the plurality of terminal devices; and notify an O-RAN Distributed Unit (O-DU) that is connected to one or more first antennas included in the plurality of antennas for a first terminal device and executes demodulation and decoding processing for the first terminal device, and is connected to one or more second antennas included in the plurality of antennas for a second terminal device and does not execute demodulation and decoding processing for the second terminal device, of information indicating the one or more first antennas and information indicating a third antenna among the one or more second antennas, the third antenna being a target of transmission path estimation performed based on pilot symbols received from the second terminal device.

12. A non-transitory computer-readable storage medium that stores a program for causing a computer included in a processing device, which functions as an O-RAN Distributed Unit (O-DU) connected to a plurality of antennas to perform radio communication with a terminal device in an Open-Radio Access Network (O-RAN), to:

receive information indicating one or more first antennas that receive a signal transmitted from a first terminal device that is a target of signal demodulation and decoding processing, among the plurality of antennas, and information indicating a third antenna among one or more second antennas that receive a signal transmitted from a second terminal device that is not a target of signal demodulation and decoding processing, among the plurality of antennas, the third antenna being a target of transmission path estimation performed based on pilot symbols received from the second terminal device;

estimate a transmission path between the third antenna and the second terminal device; and execute communication processing for the first terminal device by using a result of the transmission path estimation.

* * * * *